June 9, 1953  C. B. HULL ET AL  2,641,715
APPARATUS FOR MEASURING THE SPEED OF ELONGATED PRODUCTS
Filed Feb. 12, 1947  2 Sheets-Sheet 1
*Fig. 1.*
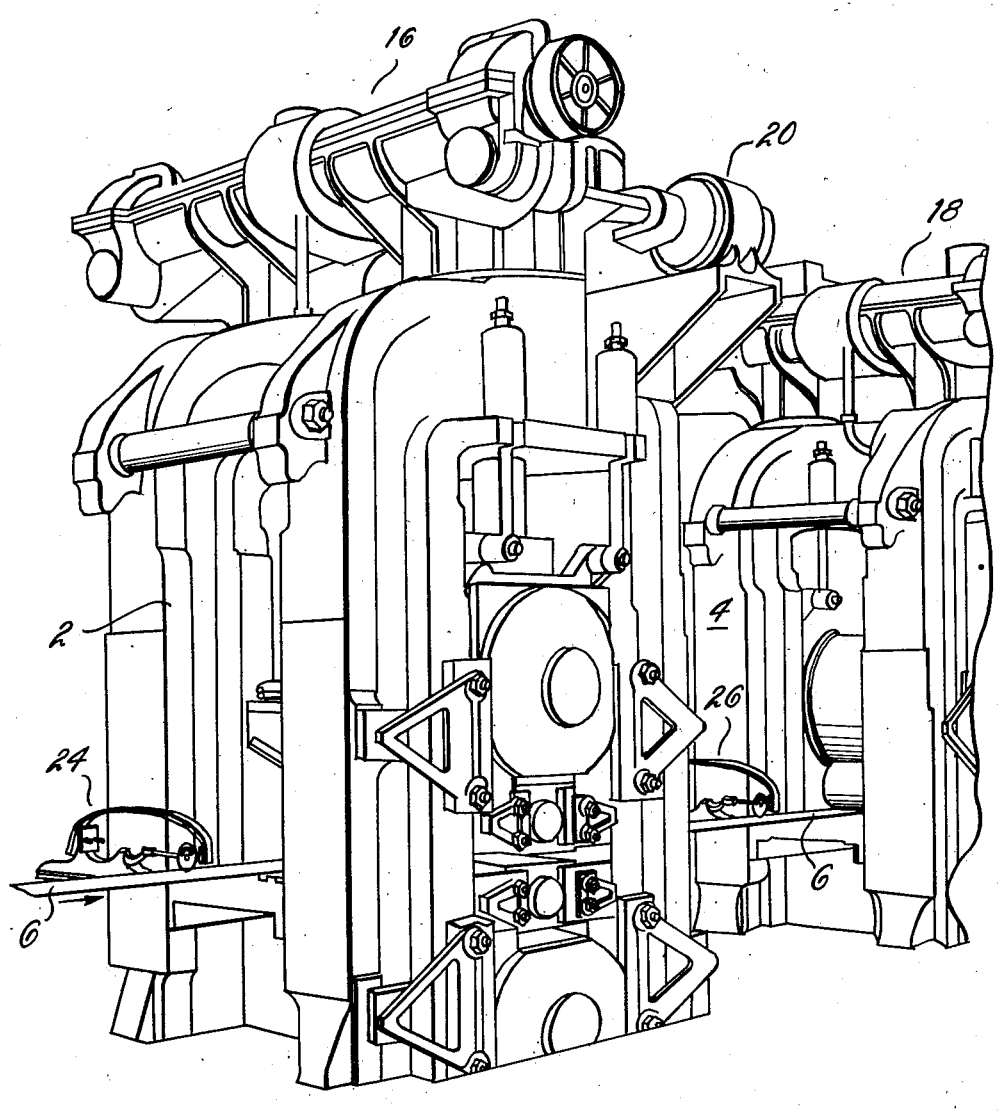
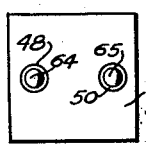
*Fig. 5.*
Inventors.
Charles B. Hull and
Carl C. Keller
By Donald G. Dalton
Their Attorney June 9, 1953     C. B. HULL ET AL     2,641,715
APPARATUS FOR MEASURING THE SPEED OF ELONGATED PRODUCTS
Filed Feb. 12, 1947     2 Sheets-Sheet 2

Inventors.
Charles B. Hull and
Carl C. Keller
By Donald G. Dalton
Their Attorney Patented June 9, 1953

2,641,715

UNITED STATES PATENT OFFICE 2,641,715

APPARATUS FOR MEASURING THE SPEED OF ELONGATED PRODUCTS

Charles B. Hull, University Heights, and Carl C. Keller, Shaker Heights, Ohio, assignors to United States Steel Corporation, a corporation of New Jersey Application February 12, 1947, Serial No. 728,110

2 Claims. (Cl. 250—233)

This invention relates to a mounting for the photocells, light source and rotary shutter of a speed-measuring system wherein the shutter is driven at a speed proportional to that of a moving element, the speed of which is to be determined.

The object of the invention is to provide a simple, compact and unitary mounting for the several parts of the system whereby they may be installed immediately adjacent to material-working means such as a strip mill and yet be protected from injury. The invention is disclosed herein as applied to an installation of this type and may be used as a gauger to control the mill screws, but is equally adapted to various other forms of apparatus where it is desired to measure the speed of a traveling member.

The invention will be more readily understood by reference to the accompanying drawings in which:

Figure 1 is a view in perspective of a portion of a continuous strip mill with shutter carrying portions or detector units of the gauging devices in accordance with the invention applied on both sides of one mill stand;

Figure 5 is a view in front elevation of the mounting means for two photocells employed in the shutter carrying means of Figure 3.

Figure 2:
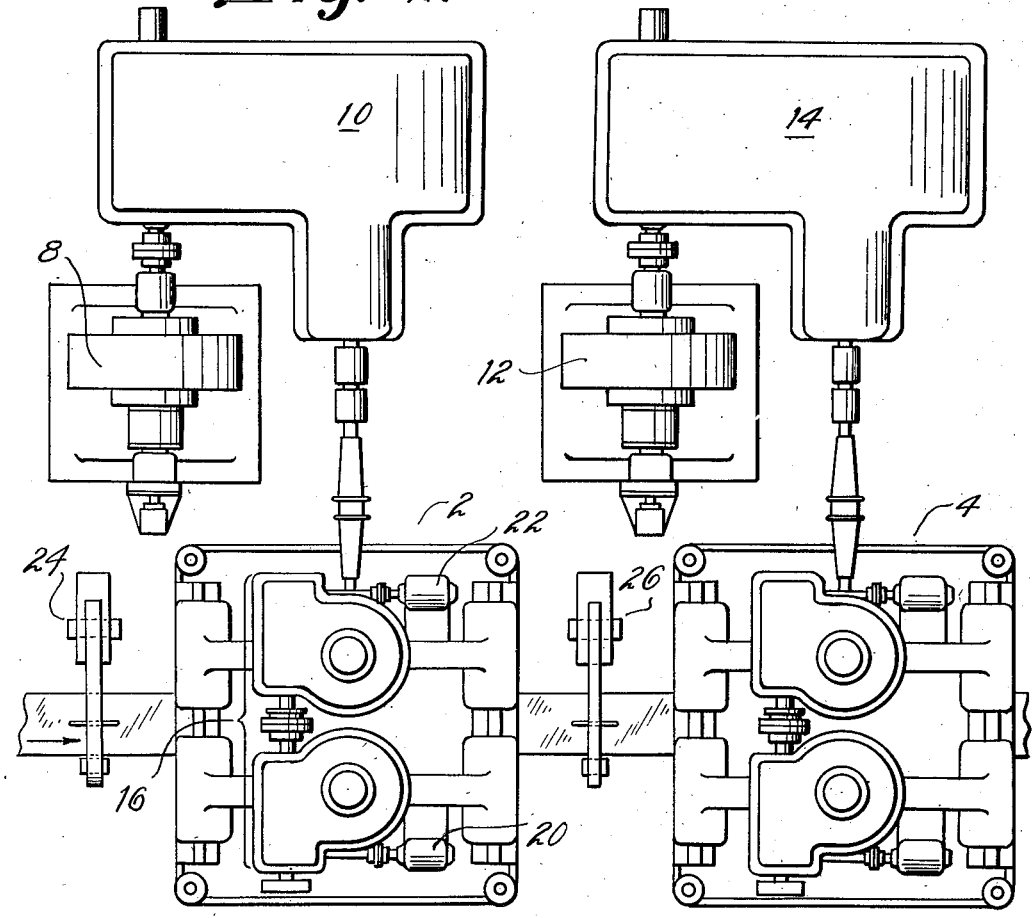
Figure 2 is a view in plan of the portion of the continuous mill shown in Figure 1.

In Figures 1 and 2 there is shown a portion of a continuous rolling mill for strip to which the speed measuring device of the present invention may be applied as an element of the screw-down control system for one or more stands thereof. In the embodiment shown, the first mill stand illustrated, which is of the four-high type, designated 2, is designed to have the gauge of the strip delivered therefrom automatically controlled by the gauging device. The second mill stand, into which strip 6 is fed after issuing from stand 2, is designated 4. As shown in Figure 2, stands 2 and 4 are driven by electric motors 8 and 12, respectively, through reducing gearing 10 and 14. Each mill stand is provided with screw-down equipment, that for mill 2 being designated 16 and that for mill 4 being denoted 18. Each of the rolling mill housings is provided with a vertical screw bearing upon the bearing block for the backing-up roll, the screw shown in the upper part of stand 2 in Figure 2 being driven by motor 22 and that shown in the lower part of such figure being driven by motor 20. A conventional screw-down control circuit selectively effects separate operation of either motor 20 or 22 in either the up or down direction, and also permits the combined operation of both motors at once in either direction for appreciable distances or for very small gauge correcting distances called "jogging." The speed measuring device of the invention is connected to this screw-down control, as will be apparent hereinafter, so as to jog both screw-down motors of one stand up or down, as required by the difference between the speeds of strip entering and leaving the stand, to hold the strip to a substantially constant gauge as rolled.

The speed measuring device is provided with a detector unit 24 mounted on the entering side of stand 2, and with a similar unit 26 mounted on the exit side. Each detector unit consists of a base 28 to be mounted on a fixed support, not shown, the inner end of the base carrying an arm 30 pivoted for tilting in a vertical plane about a pivot pin 32. The inner end of arm 30 is provided with a bearing for a shaft 36, on the end of which is mounted a shutter disc 34. A compression spring 38 is disposed between the inner end of arm 30 and base 28 and exerts an upward force on the former almost equal to the moment of the arm, shaft and disc.

Figure 3:
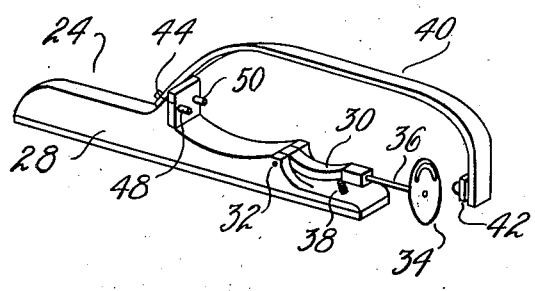
Figure 3 is an enlarged view in perspective of one of the shutter carrying detector units.
Figure 4:
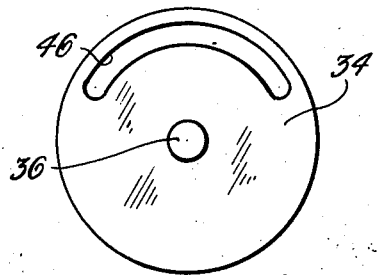
Figure 4 is a view in side elevation of one embodiment of a shutter disc.

Base 28 is further provided with a cantilever arm 40, the free end of which extends downwardly to a position opposite the shutter disc. A source of light 42 is mounted on the end of the arm for projecting a beam through one or more apertures in the disc onto photocells fixed in mountings 48 and 50 on a photocell unit 44 secured to base 28. With the detector unit mounted as shown in Figure 1, and shaft 36 disposed at right angles to the direction of motion of strip 6 and parallel to the surface of the strip, the shutter disc is frictionally driven by contact with the strip and, because of the lightness of the rotating parts 34 and 36, disc 32 will have a rim speed which is exactly the linear speed of the strip. The shutter is provided with one or more apertures of predetermined angular extent and thus for every revolution of the disc the one or more photocells employed in unit 44 will emit a certain number of impulses. With the detecting unit shown in Figure 3, which employs two photocells, there may be used a disc such as shown in Figure 4. Such disc is provided with one circular slot 46 lying between radii spaced somewhat less than 180°, the slot also lying in line with the light source and the photocells. In the modification shown in Figure 3, the axis of rotation of disc 34 lies midway between photocell mountings 48 and 50, so that for each rotation of the disc each cell emits a voltage impulse, the duration of such impulse at a given speed of rotation of the disc being determined by the angular extent of slot 46. The location and spacing of the photocells employed in the detector unit shown in Figure 3 are more clearly shown in Figure 5, wherein the mountings 48 and 50 and the photocells 64 and 65 within them, respectively, are shown located on the same horizontal line, the cells having a distance between their centers which is twice the radial center distance of slot 46.

The impulses generated by detectors 24 and 26 may be amplified by known means and supplied to any desired type of device responsive to the frequency of electrical impulses delivered thereto, for indicating the speeds at which strip enters and leaves mill stand 2 or for automatically controlling the screw-adjusting motors 20 and 22.

We claim:

1. A device for obtaining an indication of the speed of a traveling elongated product comprising a base, a photo-cell mounted thereon, an arm pivoted to said base for tilting movement in a vertical plane, and projecting over the path of the product substantially normal thereto, a shaft journaled in said arm in alinement therewith, a shutter disc on said shaft adapted to engage the product and be driven thereby, a cantilever arm extending from said base over the path of the product and a light source on said arm adapted to project a beam of light onto said photo-cell through an opening in said disc.

2. A device for obtaining an indication of the speed of a traveling elongated product comprising a base, a photocell mounted thereon, an arm pivoted to said base for tilting movement in a vertical plane, and projecting over the path of the product substantially normal thereto, a shaft journaled in said arm in alinement therewith, shutter means on said shaft adapted to be driven by said product, a cantilever arm extending from said base over the path of the product and a light source on said arm adapted to project a beam of light onto said photocell through an opening in said shutter means.

CHARLES B. HULL.
CARL C. KELLER.

References Cited in the file of this patent

UNITED STATES PATENTS

| Number | Name | Date |
|---|---|---|
| 1,450,061 | Coblentz | Mar. 27, 1923 |
| 1,618,757 | Hoxie | Feb. 22, 1927 |
| 1,871,404 | Brown | Aug. 9, 1932 |
| 1,957,681 | Thompson | May 8, 1934 |
| 1,976,355 | Mees et al. | Oct. 9, 1934 |
| 2,051,018 | Umansky | Aug. 11, 1936 |
| 2,139,489 | Cockrell | Dec. 6, 1938 |
| 2,151,570 | Shoults et al. | Mar. 21, 1939 |
| 2,230,715 | Cockrell | Feb. 4, 1941 |
| 2,281,954 | Rinia | May 5, 1942 |
| 2,332,573 | Hibschman et al. | Oct. 26, 1943 |
| 2,402,928 | Summers | June 25, 1946 |
| 2,451,971 | Oman | Oct. 19, 1948 |

FOREIGN PATENTS

| Number | Country | Date |
|---|---|---|
| 465,406 | Great Britain | May 3, 1937 |